United States Patent

Wietelmann et al.

[15] 3,637,366

[45] Jan. 25, 1972

[54] METHOD AND COMPOSITION THEREFOR

[72] Inventors: Ronald E. Wietelmann; Lawrence S. Wittenbrook, both of Marysville, Ohio

[73] Assignee: The O.M. Scott and Sons Co., Marysville, Ohio

[22] Filed: Sept. 4, 1969

[21] Appl. No.: 855,381

Related U.S. Application Data

[63] Continuation of Ser. No. 239,794, Nov. 23, 1962, abandoned.

[52] U.S. Cl. .................................71/92, 71/94, 71/103
[51] Int. Cl. .................................................A01n 9/22
[58] Field of Search ..........................71/103, 92; 260/321

[56] References Cited

UNITED STATES PATENTS

| | | | |
|---|---|---|---|
| 3,498,780 | 3/1970 | Soper et al. | 71/94 X |
| 2,238,973 | 4/1941 | Climenko | 260/397.7 |
| 2,259,222 | 10/1941 | Ewins et al. | 260/239.8 |
| 3,367,949 | 2/1968 | Soper | 260/239.8 |
| 3,482,957 | 12/1969 | Veno et al. | 71/103 X |

*Primary Examiner*—James O. Thomas, Jr.
*Attorney*—Strauch, Nolan, Neale, Nies & Kurz

[57] ABSTRACT

The herbicidal use of aminobenzenesulfonamides.

9 Claims, No Drawings

METHOD AND COMPOSITION THEREFOR

RELATION TO OTHER APPLICATIONS

This application is a continuation of application Ser. No. 239,794 filed Nov. 23, 1962 now abandoned.

This invention relates to a method of controlling vegetation such as weeds and more particularly to the discovery that sulfonamide compounds and compositions thereof, especially aminobenzenesulfonamides formerly known to have pharmacological utility, have valuable herbicidal properties.

The compounds of this invention have been found to be very effective herbicides. In general, they act to prevent seed germination and/or seedling growth and thus prevent infestation of weeds and weedy grasses in soil or vegetative areas. They have also shown activity on some established weeds.

More particularly, the compounds of this invention have been found very effective as preemergence herbicides. They have shown exceptionally high preemergence control of crabgrass and *Poa annua* and have shown high activity towards several other noxious weeds. Several have additionally shown selective postemergence activity on *Poa annua*.

The most pertinent prior art of which we are aware is German Pat. No. 1,035,962, which discloses the use of 4-(p-aminobenzenesulfamido)-thiazole and 2-(aminobenzenesulfamido)-thiazole, and German Pat. No. 1,080,100, which discloses the use of alkyl sulfonamides as insecticides and pesticides. In accordance with the present invention, it has been discovered that aminobenzenesulfonamides are effective herbicides and a novel preemergence selectivity has been discovered in connection with their application as such.

The following is a representative list of these sulfonamide compounds (for convenience, code numbers have been assigned by the O. M. Scott & Sons Company to the compounds and are used hereinafter):

| | |
|---|---|
| A-306 | N¹-2-pyrimidinylsulfanilamide |
| A-307 | N¹-Amidinosulfanilamide |
| A-310 | N¹-(4-methyl-2-pyrimidinyl)-sulfanilamide |
| A-319 | N¹-Acetylsulfanilamide |
| A-349 | Sulfanilamide |
| A-435 | N¹-Carbamoylsulfanilamide |
| A-499 N¹-2-pyridylsulfanilamide | |
| A-500 N¹-Acetylsulfanilamide | |
| A-502 | N¹-(4,6-dimethyl-2-pyrimidinyl)-sulfanilamide |

Thus, the compounds of the present invention may be represented by the general formula:

where R₁ is hydrogen or lower saturated aliphatic acyl and R₂ is hydrogen, 2-pyrimidinyl, pyridyl, amidino, acetyl or carbamoyl. 2-Pyrimidinyl, pyridyl, and amidino radicals of the compounds disclosed in this application have the following structural formulas:

2-pyrimidinyl:

where the ring is unsubstituted or substituted with lower alkyl

Pyridyl:

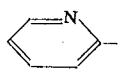

Amidino:

They have shown particularly good control of such weeds as crabgrass and *Poa annua* and good control of cress, endive, and clover.

Crabgrass and *Poa annua* are both serious weed pests and much effort has been devoted to finding herbicides which will satisfactorily control them. Annuals can develop from seed whereas desirable perennials develop from root stalk as well as seed. A desirable method for control of annuals such as *Poa annua* and crabgrass in established stands of perennial plants is therefore to prevent germination of the annuals from seed and subsequent seedling growth.

In selectively controlling *Poa annua* for example, one of the greatest difficulties is that it has many biological characteristics similar to desirable grasses. This has made this weed very difficult to control selectively in the past. The herbicides of the present invention and discovery have been found to be capable of selectively controlling *Poa annua* without damaging established desirable plants.

Typical prior preemergence herbicides include Trifluralin, Dipan, Zytron, calcium propyl arsonate and the like. Trifluralin and Dipan are trademarks under which the Eli Lilly Company markets N,N-di-(n-propyl)-2,6 dinitor-4-trifluoromethylaniline and diphenylacetonitrile, respectively; and Zytron is a trademark under which the Dow Chemical Company markets O-(2,4-dichlorophenyl) o-methyl-N-(isopropyl) phosphoramidothioate. All of the foregoing preemergence herbicides have had serious shortcomings. They have all had one or more undesirable features such as poor activity, poor selectivity, high cost or high toxicity to desirable plantings. The herbicides of the present invention, in addition to their high activity, exhibit selectivity, in that they are nontoxic to established vegetation at preemergent herbicidal rates. In accordance with the present invention and discovery, aminobenzenesulfonamides have been found to exhibit selectivity in preventing and controlling infestation of annual weeds such as *Poa annua* and crabgrass in desirable grasses in that they prevent weed germination without harming the established vegetation, and in addition selectively kill established *Poa annua*.

It is therefore a primary object of this invention to provide a method of selectively controlling weeds.

A further primary object is to provide a method of controlling weeds such as crabgrass, *Poa annua* and the like by application of aminobenzenesulfonamides by spraying, dusting, spreading or otherwise distributing, in weed or weed seed infested vegetation.

It is a further object to provide an improved method of preventing crabgrass, *Poa annua* and the like, by applying a toxic amount of aminobenzenesulfonamide such as represented by the general formula:

where R₁ is hydrogen or lower saturated aliphatic acyl and R₂ is hydrogen, 2-pyrimidinyl, pyridyl, amidino, acetyl, or carbamoyl.

A further object is to provide an improved method of weed control without harming material quantities of desirable grasses and plants by applying a toxic amount of an active ingredient such as one of the aforesaid aminobenzenesulfonamides capable of selectively attacking weed seed without excessively damaging established desirable grasses.

Further objects and advantages will become obvious to those skilled in the art from the following description and appended claims.

In general, the herbicides of this invention are selective toward infestations of undesirable monocots of the grass type such as *Poa annua* and crabgrass, but have little phytotoxic effect when used at high rates on established desirable grasses such as bluegrass and fescue.

The phytocidal compositions may be applied to the vegetative area in any convenient form. They may be dissolved or emulsified in a solvent and sprayed on the area. They may alternatively be combined with a diluent and other adjuvants to make a dust and applied with conventional dusting equipment. They may also be formulated with a granular carrier and applied with conventional granular spreaders. As used in the claims, the term "carrier" is intended to refer to any suitable carrier medium such as organic solvents, water, vermiculite, perlite, diatomaceous earth, clays, and the like materials. The addition in such spray, dust or granular formulations of diluents, stabilizers, surfactants, plant nutrients, flow-enhancing agents, adhesives, dyes or other adjuvants may be carried out to give formulations which are safely handled and convenient to apply accurately to the area to be treated. The herbicidal ingredients of this invention as applied in spray, dust or granular form may be present in the formulation in amounts from 0.02 percent to 95 percent by weight. The active ingredients, are, of course, applied in an amount sufficient to assure herbicidal action. The amount applied depends on the herbicidal activity, the formulation, the purpose for which it is being used, and the manner of application.

The best mode of carrying out the present invention is illustrated in the following example.

EXAMPLE I 8.35 grams of finely divided A-306 and 3.68 grams of alkyl benzene sodium sulfonate were added to 182 grams of expanded vermiculite. 18.4 grams of hexylene glycol was then added to the dry blend and the resulting composition mixed for 5 minutes. This method of forming a composition is described more completely in copending application Ser. No. 60,287 (now U.S. Pat. No. 3,076,699), Herbicidal Process and Product.

The composition formed as described above was spread evenly at a rate of 10 lbs./acre A-306 and gave excellent preemergence control of both crabgrass and Poa annua without damage to established bluegrass and fescue.

The following techniques were used to give the results described in table 1. To determine the herbicidal effects on germination and growth, the herbicides of this invention were blended with a suitable wetting agent; in these tests—polyoxyethylene sorbitan monolaurate currently available as "Tween 20" from Atlas Chemical Industries—and spread on a sand carrier and evenly distributed over seeded flats in the greenhouse at the indicated rates. The effect of the herbicide on the germination and growth inhibition of the various weeds was determined after 21 days. To determine the activity towards desirable grasses, the herbicide was mixed with a surfactant, dissolved or emulsified in water and sprayed evenly at the indicated rates on a greenhouse flat containing bluegrass. The resultant kill and growth inhibition were determined after 21 days. The growth inhibition was measured in cases where some germination occurred. It was determined by comparing heights of the seedlings in the treated plots with those in untreated plots. The results in table I are in percent kill and growth inhibition respectively.

TABLE IA

| Compound | Rate lbs./acre | Crabgrass Seed or Seedling Kill | Crabgrass Seed or Seedling GI | Poa annua Seed or Seedling Kill | Poa annua Seed or Seedling GI |
| --- | --- | --- | --- | --- | --- |
| A-306 | 1 | 92 | 77 | 72 | 56 |
|  | 5 | 100 | — | 100 | — |
| A-307 | 5 | 100 | — | 94 | 88 |
| A-310 | 5 | 100 | — | 94 | 88 |
|  | 10 | 100 | — | 100 | — |
| A-319 | 5 | — | — | — | — |
|  | 10 | 83 | 81 | 76 | 19 |
| A-349 | 5 | 100 | — | 100 | — |
|  | 10 | 100 | — | 100 | — |
| A-435 | 10 | 100 | — | 100 | — |
| A-499 | 10 | 98 | 92 | 100 | — |
| A-500 | 5 | 100 | — | 100 | — |
|  | 10 | 100 | — | 100 | — |
| A-502 | 5 | — | — | — | — |
|  | 10 | 59 | 77 | 88 | 71 |

TABLE IB

| Compound | Rate lbs./acre | Endive[1] Cross or Clover Seed or Seedling Kill | Endive[1] Cross or Clover Seed or Seedling GI | Established Bluegrass Kill | Established Bluegrass GI |
| --- | --- | --- | --- | --- | --- |
| A-306 | 1 | 96 | 95 | 0 | 4 |
|  | 5 | 100 | — | 23 | 54 |
| A-307 | 5 | 81 | 95 | 0 | 20 |
| A-310 | 5 | 57 | 91 | 0 | 12 |
|  | 10 | 73 | 78 | 0 | 0 |
| A-319 | 5 | — | — | 0 | 0 |
|  | 10 | — | — | — | — |
| A-349 | 5 | 73 | 91 | 0 | 0 |
|  | 10 | — | — | 5 | 15 |
| A-499 | 10 | — | — | 0 | 0 |
| A-500 | 5 | — | — | 0 | 37 |
|  | 10 | — | — | 18 | 63 |
| A-502 | 5 | — | — | 0 | 0 |
|  | 10 | — | — | — | — |

GI = percent growth inhibition

[1] A-306 at 1 lb./acre = cress

A-306 at 5 lbs./acre, A-310 at 10 lbs./acre = clover

A-307, A-310 at 5 lbs./acre and A-349 = endive

Several herbicides of this invention were tested in the field. Formulations were made up by sticking the herbicide to a carrier and adding a surfactant as described in copending U.S. application Ser. No. 60,287 for Herbicidical Composition and Process, filed Oct. 4, 1960 now U.S. Pat. No. 3,076,699). The use of a surfactant with an herbicidal compound is not necessary in carrying out the present invention. However, it has been found that better results are obtainable with its use, probably due to more effective plant or seed penetration by the active ingredient. The use of surfactants, as is well known in this art, may encompass the use of any such material compatible with the particular active ingredient being used, and capable of enhancing performance as aforesaid. Other effective wetting agents are the alkylaromatic sulfonic acids or their salts. Other spray formulations, which were also field tested, were made up by dissolving or suspending the herbicide in an aqueous medium. The herbicides were applied at the indicated rates to bare soil, which had been seeded with crabgrass and Poa annua seeds, and the kill of the seed or seedling was determined after 21 days.

The herbicides were also applied to stands of fescue and bluegrass to determine their phytotoxicity to these desirable grasses. The discoloration was determined after 1 week and the kill after 5 weeks. Table II shows the results obtained in these field tests. All the figures are percent kill or discoloration, respectively.

TABLE IIA

| Compound | Rate lbs./acre | Crabgrass Seed or Seedling Granular | Crabgrass Seed or Seedling Spray | Poa annua Seed or Seedling Granular | Poa annua Seed or Seedling Spray |
| --- | --- | --- | --- | --- | --- |
|  |  | K | K | K | K |
| A-307 | 2 | 31 | 0 | 46 | 0 |
|  | 5 | 26 | 33 | 50 | 51 |
|  | 10 | 77 | 71 | 93 | 75 |
|  | 20 | 62 | 88 | 80 | 99 |
|  | 40 | — | — | — | — |
| A-349 | 2 | 29 | 35 | 34 | 20 |
|  | 5 | 49 | 55 | 34 | 40 |
|  | 10 | 60 | 78 | 68 | 94 |
|  | 20 | 67 | 99 | 84 | 99 |
|  | 40 | — | — | — | — |
| A-306 | 2 | 68 | — | 84 | — |
|  | 5 | 84 | — | 99 | — |
|  | 10 | 99 | — | 99 | — |
|  | 20 | 99 | — | 100 | — |
|  | 40 | — | — | — | — |
| A-310 | 2 | 43 | — | 47 | — |
|  | 5 | 28 | 30 | — | — |
|  | 10 | 45 | — | 56 | — |
|  | 20 | 87 | — | 99 | — |
|  | 40 | — | — | — | — |

TABLE IIB

| Compound | Rate lbs./acre | Established Bluegrass Granular | | Spray | | Established Fescue Granular | | Spray | |
|---|---|---|---|---|---|---|---|---|---|
| | | K | D | K | D | K | D | K | D |
| A-307 | 2 | — | — | — | — | 0 | 0 | 5 | tr |
| | 5 | 0 | 0 | 0 | 0 | tr | — | 0 | 5 |
| | 10 | 0 | 0 | 0 | 0 | 0 | 5 | 5 | 15 |
| | 20 | 0 | 0 | 0 | tr | — | 5 | 5 | 25 |
| | 40 | 0 | 0 | 0 | 5 | — | 0 | 40 | 90 |
| A-349 | 2 | 0 | 0 | 0 | 0 | — | 10 | 0 | 0 |
| | 5 | 0 | 0 | 0 | 0 | 0 | 5 | 0 | 0 |
| | 10 | 0 | 0 | 0 | 0 | 0 | 5 | 0 | 10 |
| | 20 | 0 | 0 | 0 | tr | — | 10 | 0 | 15 |
| | 40 | 0 | — | 0 | tr | — | 20 | 0 | 20 |
| A-306 | 2 | 0 | 0 | — | 0 | — | tr | — | — |
| | 5 | — | 0 | — | — | — | 0 | — | — |
| | 10 | — | 0 | — | 0 | — | 0 | — | — |
| | 20 | — | 0 | — | 0 | — | 0 | — | — |
| | 40 | 0 | 0 | — | 7.5 | — | 5 | — | — |
| A-310 | 2 | — | — | — | 0 | — | 0 | — | — |
| | 5 | 0 | 0 | — | 0 | — | tr | — | — |
| | 10 | 0 | tr | — | 0 | — | tr | — | — |
| | 20 | 0 | 0 | — | 0 | — | 5 | — | — |
| | 40 | | tr | — | 0 | — | 10 | — | — |

K = percent kill
D = percent discoloration

The above data in table II were determined in biological tests and reflect biological variations normally seen in such tests.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of weed control comprising applying to the area to be treated a phytotoxic amount of a compound having the formula:

where $R_1$ is H or lower saturated aliphatic acyl and $R_2$ is lower alkyl substituted 2-pyrimidinyl or unsubstituted 2-pyrimidinyl.

2. The method of claim 1, wherein the compound is $N^1$-2-pyrimidinylsulfanilamide.

3. The method of claim 1, wherein the compound is $N^1$-(4-methyl-2-pyrimidinyl)-sulfanilamide.

4. The method of crabgrass control comprising applying to the area to be treated a phytotoxic amount of a compound having the formula

where $R_1$ is H or lower saturated aliphatic acyl and $R_2$ is lower alkyl substituted 2-pyrimidinyl or unsubstituted 2-pyrimidinyl.

5. The method of claim 4, wherein the compound is $N^1$-2-pyrimidinylsulfanilamide.

6. The method of claim 4, wherein the compound is $N^1$-(4-methyl-2-pyrimidinyl)-sulfanilamide.

7. The method of *Poa annua* control comprising applying to the area to be treated a phytotoxic amount of a compound having the formula

where $R_1$ is H or lower saturated aliphatic acyl and $R_2$ is lower alkyl substituted 2-pyrimidinyl or unsubstituted 2-pyrimidinyl.

8. The method of claim 7, wherein the compound is $N^1$-2-pyrimidinylsulfanilamide.

9. The method of claim 7, wherein the compound is $N^1$-(4-methyl-2-pyrimidinyl)-sulfanilamide.

* * * * *